(12) United States Patent
De Gennaro et al.

(10) Patent No.: US 7,369,050 B1
(45) Date of Patent: *May 6, 2008

(54) CURTAIN FOR ISOLATING RADIO PROPAGATION ZONES

(75) Inventors: Steven V. De Gennaro, Pawling, NY (US); Sastry S. Duri, Yorktown Heights, NY (US); Paul A. Moskowitz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/937,971

(22) Filed: Nov. 9, 2007

(51) Int. Cl.
*G08B 13/14* (2006.01)

(52) U.S. Cl. .................. 340/572.1; 340/10.1; 343/838; 343/841; 700/214; 700/215; 700/217

(58) Field of Classification Search ............... 340/10.1, 340/572.1; 343/838, 841; 700/214, 215, 700/217
See application file for complete search history.

(56) References Cited

U.S. PATENT DOCUMENTS

| | | | |
|---|---|---|---|
| 6,967,579 | B1 | 11/2005 | Elizondo |
| 7,187,288 | B2 | 3/2007 | Mendolia et al. |
| 2005/0110641 | A1 | 5/2005 | Mendolia et al. |

*Primary Examiner*—George Bugg
*Assistant Examiner*—Samuel J. Walk
(74) *Attorney, Agent, or Firm*—Cantor Colburn LLP; Mark Wardas

(57) ABSTRACT

A curtain for a radio frequency identification (RFID) system including a transponder, an antenna, and a reader, the antenna coupled to the reader, the antenna and the reader for transmitting a radio signal to the transponder and for receiving a response radio signal from the transponder, the response radio signal including data from the transponder, the curtain including: a plurality of flexible strips that limit propagation of the radio signal; wherein the strips are transparent to visible light, the long edge of each of the strips is oriented in substantially the vertical direction, more than one strip overlaps a portion of the width of an adjacent strip along the length of the adjacent strip, and the length of each of the strips is substantially greater than the width of each of the strips.

5 Claims, 2 Drawing Sheets

CURTAIN FOR ISOLATING RADIO PROPAGATION ZONES

CROSS-REFERENCES TO RELATED APPLICATIONS

The present application is co-pending with the concurrently filed applications, entitled "SYSTEM FOR ISOLATING RADIO PROPAGATION ZONES" and "METHOD FOR ISOLATING RADIO PROPAGATION ZONES" assigned to the assignee of the present application, the contents of which are incorporated herein by reference in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a radio frequency identification (RFID) system that limits propagation of radio signals. In particular, the radio signals are diminished outside of an area monitored by the RFID system 2. Description of the Related Art A radio frequency identification (RFID) system is useful for many applications. One application involves tracking items in a business. The RFID system can receive data from transponders (referred to as "tags") affixed to the items. By "reading" the data, the RFID system can be used by the business to identify each item with a tag and associated location.

The RFID system generally includes an antenna, a reader, a server, an operator terminal and a database. The antenna transmits a radio signal that is received from the reader. The radio signal is received by a tag (RFID transponder) affixed to an item. The tag, in turn, responds to the radio signal by sending a response radio signal that includes data stored within the tag. The reader receives the responding radio signals via the antenna. From the responding radio signal, the reader can extract the data sent by the tag. The data is generally sent to the server from which the data can be accessed by the operator terminal or stored in the database.

The RFID tag or transponder can be one of passive, semi-passive (also referred to as "battery-assisted"), and active. A passive RFID tag does not have a battery or a transmitter. A passive tag receives energy to operate from the radio signal transmitted by the RFID reader. The passive tag transmits a response to the radio signal by modulating and reflecting the radio signal. One example of the passive tag is the tag contained within an access control badge such as the tags manufactured by HID Global of Irvine, Calif. A semi-passive tag (or semi-active) tag includes a battery to supply energy for operation. The semi-passive tag does not include a transmitter. The semi-passive tag also operates by modulating and reflecting the radio signal. One example of the semi-passive tag is the E-ZPass tag used for electronic toll collection. An active tag includes a battery and a transmitter. Unlike the passive and semi-passive tags, the active tag is capable of initiating a transmission to the reader. One example of the active tag is the tag used for object location produced by WhereNet of Santa Clara, Calif.

In one application of the RFID system, the RFID system is used to identify tagged items as the items pass through a receiving portal. In one embodiment, the reader is turned on in advance of the tagged item entering a receiving portal. The reader is turned on in advance to allow sufficient time to read the tag. After the tag has been read and passed through the portal, the reader is turned off to save on the duty cycle of the reader.

A portal may separate regions or areas while still allowing for the passage of physical objects such as people, packages, and machinery. Some examples of portals include a gateway separating a loading dock from a receiving area, an opening between two divided areas in a retail establishment, an opening through which luggage is transported on a conveyer belt in an airport, and spaces or openings through which packages pass in a sorting facility at a delivery company.

In some applications, after a tagged item has passed through the portal, the item is stored in a staging area nearby the portal. In some instances, the reader may read a tag in the nearby staging area. It is not desired to read the same tag again in the staging area after the tag was already read while passing through the portal.

Reading the same tag multiple times can lead to problems such as misinterpretation by a business computing system. For example, reading a tag on an item that was already received through the portal may result in an erroneous message being communicated to an operator that an unexpected item is being received.

Another problem with the reader reading a tag in the nearby staging area is that it may be difficult to determine the location of the tag. In one application, multiple readers may be used with each reader assigned to a separate area. If readers in adjacent areas read the same tag, an operator may not be able to determine which area the tag is in. Additionally, when adjacent areas are each equipped with a reader, the readers may interfere with each other. The interference may occur because power levels of signals emitted from antennas associated with the readers are many orders of magnitude greater than the response radio signals emitted from the tags.

Attempts have been made to avoid a reader reading tags in nearby areas. One attempt includes restricting the power levels of radio signals emitted by the reader. Restricting the power levels limits the range of the radio signals. However, it has been found that restricting the power levels also decreases the accuracy of reading the tags.

Therefore, what are needed are techniques that limit a signal emitted from an antenna associated with a reader from propagating to an unwanted area. In particular, the techniques do not reduce the accuracy of reading a tag.

SUMMARY OF THE INVENTION

The shortcomings of the prior art are overcome and additional advantages are provided through the provision of a curtain for a curtain for a radio frequency identification (RFID) system including a transponder, an antenna, and a reader, the antenna coupled to the reader, the antenna and the reader for transmitting a radio signal to the transponder and for receiving a response radio signal from the transponder, the response radio signal including data from the transponder, the curtain including: a plurality of flexible strips that limit propagation of the radio signal; wherein the strips are transparent to visible light, the long edge of each of the strips is oriented in substantially the vertical direction, more than one strip overlaps a portion of the width of an adjacent strip along the length of the adjacent strip, and the length of each of the strips is substantially greater than the width of each of the strips.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, wherein like number drawings are numbered alike, in which:

Figure 1:
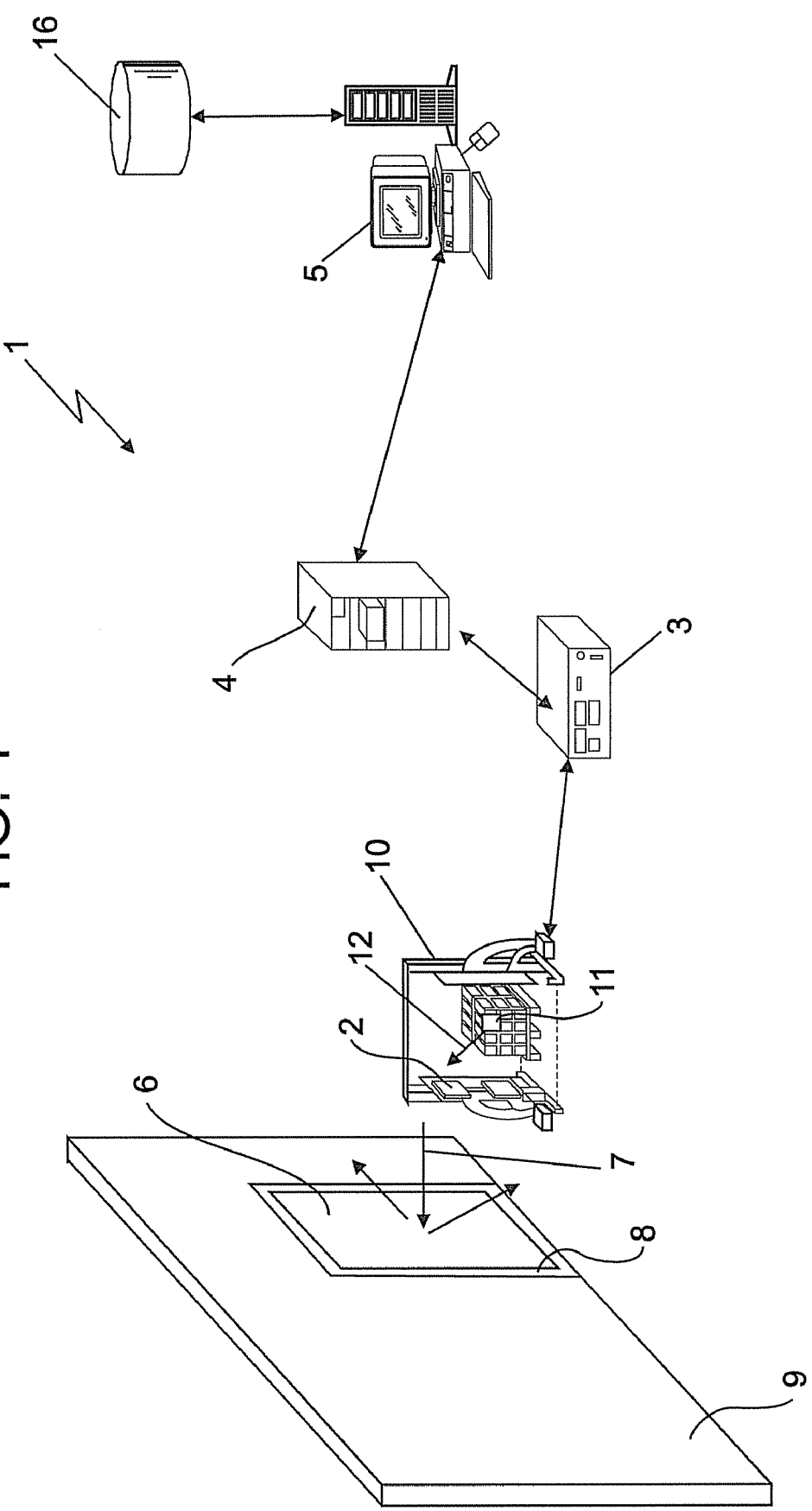
FIG. 1 illustrates an exemplary embodiment of a radio frequency identification system (RFID)

The detailed description explains the preferred embodiments of the invention, together with advantages and features, by way of example with reference to the drawings.

DETAILED DESCRIPTION OF THE INVENTION

The teachings provide a radio frequency identification (RFID) system, curtain, and method that limits propagation of electromagnetic signals emitted by an antenna in the RFID system. In particular, the RFID system, the curtain, and the method do not reduce the accuracy of receiving a response signal from a transponder.

The RFID system uses a curtain to limit propagation of the electromagnetic signals. The curtain is made from materials that at least one of reflect, disperse and absorb the electromagnetic signals. The materials are selected to limit propagation of electromagnetic signals having a strength and a frequency used by the electromagnetic signals of the RFID system. In one example, the curtain is disposed in a doorway between a first area monitored by a first antenna and a second area monitored by a second antenna. The curtain prevents the electromagnetic signals emitted from the first antenna from activating a transponder located in the second area. Similarly, the curtain prevents the electromagnetic signals emitted from the second antenna from activating a transponder in the first area. By including the curtain with the RFID system, strength of the electromagnetic signals emitted from an antenna does not have to be decreased. Not decreasing the strength provides for improved accuracy of receiving a response signal from a transponder.

For convenience, certain definitions and descriptions are now provided. The term "radio frequency identification (RFID) system" relates to a system for receiving information from a transponder. The term "transponder" (also referred to as a "tag") relates to a device that sends an electromagnetic signal (outgoing signal) containing data on receipt of an electromagnetic signal (incoming signal) from the RFID system. The tag may send the electromagnetic signal either by modulating and reflecting the incoming signal or by transmitting the electromagnetic signal with a transmitter. The tag may include an integrated circuit for containing the data. In business applications, the tag is normally located on an object such as box or pallet. In these applications, the tag may contain data related to the object to which the tag is affixed. The term "reader' relates to an electronic device that can send and receive electromagnetic signals via an antenna. In one embodiment, the electromagnetic signals are in the radio wave spectrum. The term "radio signal" as used herein relates to all electromagnetic signals. The reader, upon activation, transmits a radio signal via the antenna. The tag receives the radio signal and sends a response radio signal. The response radio signal includes the data contained within the tag. The reader receives the response radio signal via the antenna. The reader can extract the data from the radio signal and forward the data to electronic processing systems such as a server, an operator terminal, and a database.

The term "portal" relates to a space between two regions or areas. The space may include an opening in a wall such as a doorway or window opening.

The term "homogeneous" relates to a material having a uniform composition throughout. The term "flexible" relates to a material that deforms when a force is applied to the material. For example, a flexible material will deform about an object or person as the object or the person makes contact with the material.

The term "substantially greater than" relates to a rectangular strip of a curtain in which the vertical length of the strip is greater than ten times the width of the strip. In general, the curtain will more easily allow a person, a vehicle, and an object to pass than if the rectangular strips did not have a length that is substantially greater than the width. The term "transparent" relates to a curtain with enough transmissivity to enable a person on one side of the curtain to detect another person or object on the other side of the curtain.

FIG. 1 illustrates an exemplary embodiment of an RFID system 1. Referring to FIG. 1, the RFID system 1 includes an antenna 2 that is coupled to a reader 3. The antenna 2 transmits a radio signal 7 received from the reader 3. The antenna 2 in FIG. 1 is supported at the side of a receiving portal 10. The portal 10 separates two regions. Objects from one region can enter the other region through the portal 10. The RFID system 1 shown in FIG. 1 also includes a transponder 11 (also referred to as a tag 11). The tag 11 upon receiving the radio signal 7 transmits a response radio signal 12. The response radio signal 12 is received by the reader 3 via the antenna 2. The response radio signal 12 includes data stored in the tag 11.

In the embodiment of FIG. 1, the reader is coupled to a server 4, which, in turn, is coupled to an operator terminal 5. The operator terminal 5 in FIG. 1 is coupled to a database 16. The database 16 may be implemented by a computer processing system that includes at least one storage device for storing the database 16. The data received by the reader 3 (via the response radio signal 12) is transmitted to the server 4. The data can also be transmitted to the operator terminal 5 and stored in the database 16.

Referring to FIG. 1, the RFID system 1 also includes a curtain 6 for limiting propagation of the radio signals 7. In the embodiment of FIG. 1, the curtain 6 is shown disposed in an opening 8 in the wall 9. In this embodiment, the wall 9 delineates one border of an area monitored by the antenna 2 and the reader 3. The curtain 6 limits propagation of the radio signals 7 through the opening 8. By limiting the propagation of the radio signals 7 through the opening 8, the curtain 6 prevents activating any tag 11 that may be on the other side of the wall 9.

In the embodiment of FIG. 1, the curtain 6 is made from one piece of a material that is flexible and homogeneous. In another embodiment, the curtain 6 includes a homogeneous material to which at least one homogenous coating is applied.

Figure 2:
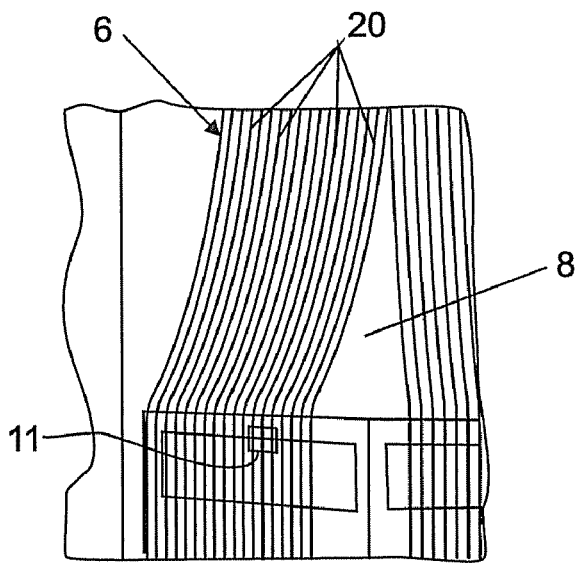
FIG. 2 illustrates an exemplary embodiment of a curtain for limiting propagation of radio signals used in the RFID system.

FIG. 2 illustrates an exemplary embodiment of the curtain 6 disposed in the opening 8. Referring to FIG. 2, the curtain 6 is made of a plurality of strips 20. In FIG. 2, the strips 20 are transparent and suspended from above. The strips 20 are flexible and allow passage of at least one of a person, a vehicle such as a forklift, and an object through the curtain 6. The strips 20 are long enough and wide enough to fill the cross-sectional area of the opening 8. In the embodiment of FIG. 2, the strips 20 are rectangular in shape with the length of each of the strips 20 substantially greater than the width of each of the strips 20. When nothing is passing through the curtain 6, the long edge of each of the strips 20 is oriented in substantially the vertical direction. In other embodiments, the strips 20 can have other shapes adapted for limiting the propagation of the radio signals 7. Transparency of the strips 20 is an important safety feature. For example, transparency allows a person on one side of the strips 20 to see a forklift coming from the other side of the strips 20.

Figure 3:
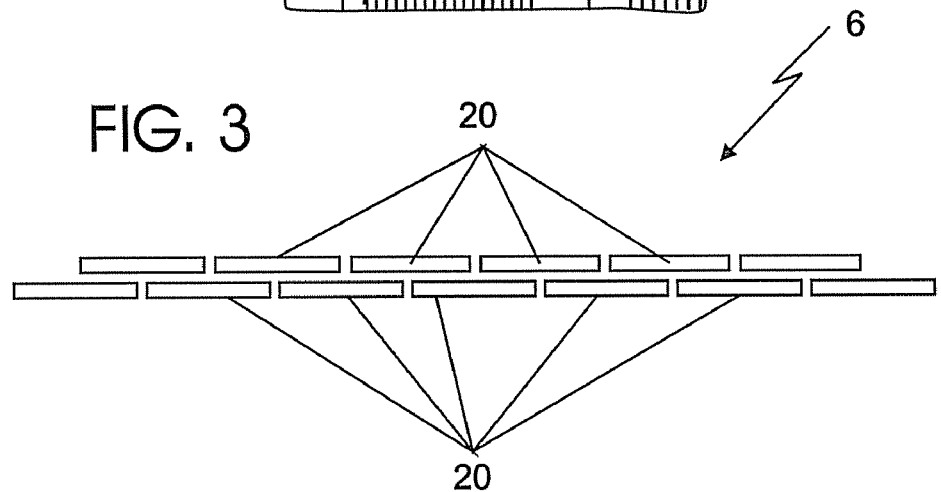
FIG. 3 illustrates a top view of an exemplary embodiment of curtain strips.

Vertical edges of each of the strips 20 can overlap adjacent strips 20 to limit the radio signals 7 from propagating through an opening between any two of the strips 20. In one embodiment, more than one the strips 20 overlaps a portion of the width of one of the adjacent strips 20 (referred to as "adjacent strip 20") along the length of the adjacent strip 20. In another embodiment, the overlap can be about fifty percent of the width of the adjacent strip 20. The amount of overlap is the amount necessary to limit propagation of the radio signals 7. FIG. 3 illustrates a top view of an exemplary embodiment of the plurality of strips 20 with an overlap of about fifty percent. For illustration purposes, a small gap is depicted between adjacent strips 20 in FIG. 3. However, the plurality of strips 20 can be fabricated with little or no gap between the adjacent strips 20.

Different types of materials can be used to make the curtain 6. For example, the material can be a homogeneous conductive material such as at least one of a conductive plastic and a conductive polymer. In general, the conductive plastic and the conductive polymer are selected to have high conductive properties. Conductive polymers referred to as "zero band gap conductive polymers" have conductive properties similar to metals. In addition, conductive polymers can be doped to improve their conductive properties. In general, conductive polymers can be doped by at least one of chemical doping, electrochemical doping, and self-doping. Advantages of using at least one of a conductive plastic and a conductive polymer are that these materials are flexible, elastic, malleable, and rugged enough to survive use in a commercial environment.

Another type of material that can be used to make the curtain 6 is a homogeneous material that is at least one of mixed with an antistatic agent and coated with an anti-static agent. The antistatic agent is used to make the material of the curtain 6 conductive. In one embodiment, the antistatic agent is mixed with the homogeneous material to make the material for the curtain 6. In another embodiment, the antistatic agent (also referred to as a "homogeneous coating") is applied as a coating to the homogeneous material. Some examples of antistatic agents include long-chain aliphatic amines (optionally ethoxylated) and amides, quaternary ammonium salts (e.g., behentrimonium chloride or cocamidopropyl betaine), esters of phosphoric acid, polyethylene glycol esters, and polyols. Indium tin oxide is an example of an antistatic coating that is transparent. One example of the antistatic agent is BAYTRON® available from H.C. Stark GmbH of Goslar, Germany. The homogeneous material used with the coating may be one of conductive and non-conductive. On example of a homogeneous non-conductive material is a plastic such as polyvinyl chloride (PVC).

Pure metal coatings, such as those that use a thin layer of aluminum or copper, may also be used to coat the homogeneous material. Very thin metal coatings may be transparent to visible light. By using a transparent base material, such as a transparent plastic, with a coating of a transparent antistatic agent, the entire curtain may be made transparent to visible light.

Different embodiments using combinations of at least one of the homogeneous conductive material, the homogeneous coating, and the homogeneous non-conductive material are possible. In a first embodiment, the curtain 6 uses the homogeneous conductive material to limit propagation of the radio signals 7. In a second embodiment, the curtain 6 uses the homogeneous conductive material and the homogenous coating to limit propagation of the radio signals 7. In a third embodiment, the curtain 6 uses the homogeneous coating applied to a homogeneous non-conductive material to limit propagation of the radio signals 7.

Embodiments of the curtain 6 can be made from materials that absorb the radio signals 7. One class of materials that absorb the radio signals 7 includes plastics such as acrylonitrile butadiene styrene (ABS) plastic. Plastic absorbers of the radio signals 7 may be used to form the curtain 6. Alternatively, the plastic absorbers may be used as at least one of a coating and a laminate in conjunction with a transparent plastic to form the curtain 6 that is transparent.

Another class of materials that absorb the radio signals 7 includes plastics that contain an even dispersion of particles (or powder) of ferrite materials such as at least one of iron and nickel oxide. By using a transparent plastic, the curtain 6 may be made to be transparent. Alternatively, the particles of ferrite materials may be coated or evenly dispersed on the surface of a transparent plastic to form the curtain 6 that is transparent. Materials using ferrite particles to absorb the radio signals 7 are available from TDK RF Solutions Inc. of Cedar Park, Tex.

As with the conductive polymers, the transparent plastic is flexible, elastic, malleable, and rugged enough to survive use in a commercial environment.

Figure 4:
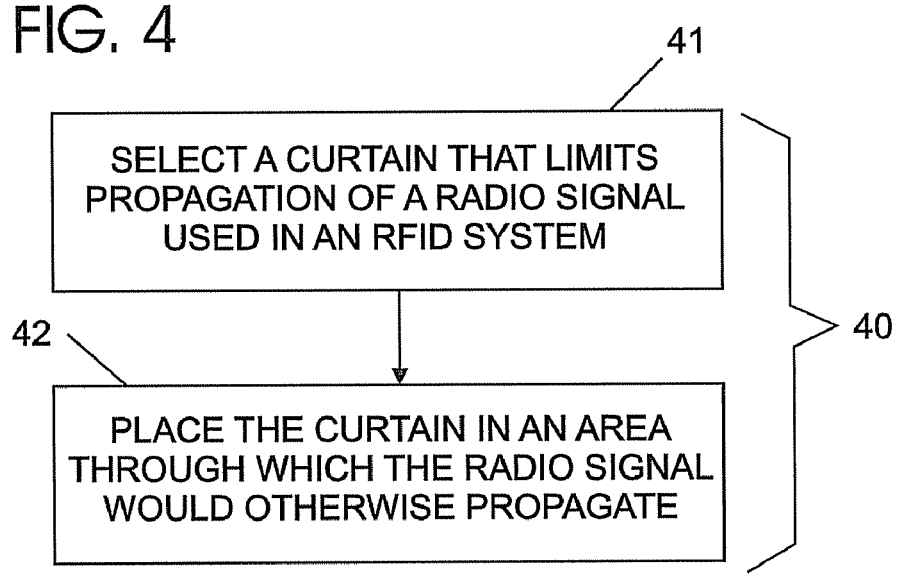
FIG. 4 presents one example of a method for using the RFID system.

FIG. 4 presents one example of a method 40 for using the RFID system 1. The method 40 calls for selecting (step 41) the curtain 6 for limiting propagation of the radio signal 7 in the RFID system 1. The curtain 6 can be made from a flexible homogeneous material that is conductive. The curtain 6 can also be made of a flexible homogeneous material that has a homogeneous coating of at least one of a conductive material and an antistatic agent. The curtain 6 can also be made from a material that absorbs the radio signals 7. Further, the method 40 calls for placing (step 42) the curtain 6 in a space through which the radio signal 7 would otherwise propagate. The step 42 may include placing the curtain 6 in the portal 10, which may be an opening in a wall such as a doorway, through which at least one of a person, a vehicle, and an object may pass. The portal 10 may separate a first region containing the RFID system 1 from a second region containing at least one of another transponder 11 and another antenna 2. The step 42 may also include placing the curtain 6 so that the curtain 6 surrounds an area to be monitored by the RFID system 1.

Various other components and features may be included and called upon for providing for aspects of the teachings herein. For example, a support structure for the curtain 6 may be included in support of the various aspects discussed herein or in support of other functions beyond this disclosure. In one embodiment of the strips 20, at least one of a shape of the strips 20, an assembly of the strips 20, and the support structure of the strips 20 may provide for overlapping edges. The overlapping edges can limit the propagation of the radio signals 7. In another embodiment, the strips 20 may include a magnetic material disposed along edges of the strips 20. The magnetic material can provide for attraction of the edges to each other to limit the propagation of the radio signals 7. The strength of the magnetic field associated with the magnetic material is such as to allow the strips 20 to separate as an object passes through the strips 20. In another embodiment, the curtain 6 may be opened and closed by at least one of manually and automatically. The teachings include those components and features used to at least one of manually and automatically open and close the curtain 6.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A curtain for a radio frequency identification (RFID) system comprising a transponder, an antenna, and a reader, the antenna coupled to the reader, the antenna and the reader for transmitting a radio signal to the transponder and for receiving a response radio signal from the transponder, the response radio signal comprising data from the transponder, the curtain comprising:

a plurality of flexible strips that limit propagation of the radio signal;

wherein the strips are transparent to visible light, the long edge of each of the strips is oriented in substantially the vertical direction, more than one strip overlaps a portion of the width of an adjacent strip along the length of the adjacent strip, and the length of each of the strips is substantially greater than the width of each of the strips.

2. The curtain as in claim 1, wherein the strips comprise one of a homogeneous conductive material, a homogeneous conductive material coated with a homogeneous coating, and a homogeneous non-conductive material with a homogeneous coating, wherein the homogeneous conductive material comprises at least one of a conductive plastic, a conductive polymer, and an antistatic agent; the homogeneous coating comprises at least one of the antistatic agent, another antistatic agent, and a metal; and the homogeneous non-conductive material comprises a plastic.

3. The curtain as in claim 1, wherein the strips comprise a material that absorbs the radio signal.

4. The curtain as in claim 3, wherein the material comprises acrylonitrile butadiene styrene (ABS) plastic.

5. The curtain as in claim 1, wherein a magnetic material is disposed on at least two vertical edges of each of the strips for each of the strips to attract an adjacent strip.

* * * * *